US007912452B2

United States Patent
Zhu

(10) Patent No.: US 7,912,452 B2
(45) Date of Patent: Mar. 22, 2011

(54) AUTHENTICATING A REMOVABLE USER IDENTITY MODULE TO AN INTERNET PROTOCOL MULTIMEDIA SUBSYSTEM (IMS)

(75) Inventor: Hong Ru Zhu, Beijing (CN)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 901 days.

(21) Appl. No.: 11/413,612

(22) Filed: Apr. 28, 2006

(65) Prior Publication Data

US 2007/0197226 A1    Aug. 23, 2007

(30) Foreign Application Priority Data

Feb. 10, 2006  (CN) .......................... 2006 1 0071143

(51) Int. Cl.
  *H04M 1/66* (2006.01)
(52) U.S. Cl. ........ 455/411; 455/433; 455/445; 455/558; 726/12; 370/352; 370/356
(58) Field of Classification Search .................. 455/411, 455/558, 435.2, 433, 445; 370/352, 401, 370/338; 709/229; 713/168
See application file for complete search history.

(56) References Cited

U.S. PATENT DOCUMENTS

| | | | | |
|---|---|---|---|---|
| 5,600,708 A * | 2/1997 | Meche et al. | ................. | 455/411 |
| 5,642,401 A * | 6/1997 | Yahagi | .......................... | 455/411 |
| 6,091,945 A * | 7/2000 | Oka | ............................... | 455/411 |
| 6,678,517 B2 * | 1/2004 | Naim et al. | ................. | 455/414.1 |
| 6,859,651 B2 * | 2/2005 | Gabor | ........................... | 455/411 |
| 6,871,070 B2 * | 3/2005 | Ejzak | ......................... | 455/435.1 |
| 6,977,917 B2 * | 12/2005 | Skog et al. | .................... | 370/349 |
| 7,079,834 B2 * | 7/2006 | Kyung et al. | ................. | 455/410 |
| 7,155,526 B2 * | 12/2006 | Chaudhary et al. | .......... | 709/229 |
| 7,734,909 B1 * | 6/2010 | Roush et al. | .................. | 713/154 |
| 7,770,216 B2 * | 8/2010 | Blicker et al. | ................. | 726/12 |
| 7,787,443 B2 * | 8/2010 | Varney et al. | ................. | 370/352 |
| 7,792,093 B2 * | 9/2010 | Myhre et al. | .................. | 370/352 |
| 2003/0154400 A1 * | 8/2003 | Pirttimaa et al. | ............. | 713/201 |
| 2004/0085949 A1 * | 5/2004 | Partanen et al. | ................ | 370/352 |
| 2004/0136398 A1 * | 7/2004 | Enzmann et al. | ............. | 370/465 |
| 2004/0148416 A1 * | 7/2004 | Aarnos et al. | ................. | 709/230 |
| 2004/0156394 A1 * | 8/2004 | Westman | ...................... | 370/471 |
| 2005/0243840 A1 * | 11/2005 | Sivalingam et al. | .......... | 370/401 |
| 2006/0030320 A1 * | 2/2006 | Tammi et al. | .............. | 455/435.2 |
| 2006/0146792 A1 * | 7/2006 | Ramachandran et al. | .... | 370/352 |
| 2006/0195898 A1 * | 8/2006 | Blicker | ........................... | 726/12 |
| 2007/0060097 A1 * | 3/2007 | Edge et al. | ................. | 455/404.1 |
| 2007/0121596 A1 * | 5/2007 | Kurapati et al. | .............. | 370/356 |
| 2007/0195805 A1 * | 8/2007 | Lindgren | ...................... | 370/401 |
| 2007/0289009 A1 * | 12/2007 | Phan-Anh | ....................... | 726/12 |
| 2008/0168540 A1 * | 7/2008 | Agarwal et al. | .................... | 726/5 |
| 2008/0194255 A1 * | 8/2008 | Walker et al. | ................. | 455/433 |
| 2010/0214924 A1 * | 8/2010 | Sendra Alcina et al. | ...... | 370/235 |

* cited by examiner

*Primary Examiner* — Sharad Rampuria
(74) *Attorney, Agent, or Firm* — Williams, Morgan & Amerson

(57) ABSTRACT

The present invention provides a method that may include accessing a first address and an identifier provided by a mobile unit, providing the identifier, receiving a second address associated with the identifier in response to providing the identifier, and authenticating the mobile unit based on the first and second addresses.

18 Claims, 3 Drawing Sheets

AUTHENTICATING A REMOVABLE USER IDENTITY MODULE TO AN INTERNET PROTOCOL MULTIMEDIA SUBSYSTEM (IMS)

This patent application claims priority to the previously filed Chinese Application No. 200610071143.7 which was filed with the Chinese Patent Office on Feb. 10, 2006.

BACKGROUND OF THE INVENTION

1. Field of the Invention

This invention relates generally to communication systems, and, more particularly, to wireless communication systems.

2. Description of the Related Art

Security for cellular networks has evolved rapidly in recent years, in large part due to the increasing customer demand for wireless services, such as voice communication, data communication, and multimedia services like video telephony. Cryptographic digital authentication may be implemented in digital communication systems, such as Second Generation (2G) wireless communication systems, to protect service providers from the fraudulent use of their networks and to provide user privacy. For example, the Telecommunication Industry Association (TIA), the Electronics Industry Association (EIA), and others developed a 64-bit security scheme called ANSI TIA/EIA-41. The TIA/EIA-41 security scheme provides mutual authentication between a home authentication center (e.g., a Home Location Register/Authentication Center, HLR/AuC) and a user identity module (UIM), such as a removable user identity module (R-UIM), which is typically a card that can be inserted into a mobile shell, or an integrated UIM.

In the TIA/EIA-41 security scheme, a private key, such as a 64-bit random secret known as the A-KEY, is pre-provisioned to a well-protected database in the HLR/AuC and the R-UIM. The private key may be used to secure the wireless link between the HLR/AuC and the R-UIM. For example, the private key may be used to generate a temporary secondary key (known as the shared secret data, SSD, key). The system may then initiate a global challenge authentication by providing a random number (RAND) to the R-UIM, which computes a short digital signature:

$$AUTHR=f(RAND, SSD\_A, ESN, AUTH\_DATA),$$

where $f(\ )$ is a standardized function called CAVE, SSD_A is a selected portion of the SSD key, ESN is the electronic serial number associated with the R-UIM, and AUTH_DATA is populated based on the mobile unit's mobile identification number (MIN). The R-UIM provides the AUTHR digital signature to the system (e.g., the HLR/AuC), which may validate the R-UIM based on the AUTHR digital signature. The R-UIM and the HLR/AuC may also compute additional keys, such as a 64-bit signaling message key (SMEKEY) and a 520-bit voice privacy mask (VPM), which may be used as a seed to generate a private long code mask (PLCM), as opposed to the public long code mask that may be generated from the publicly known electronic serial number (ESN) of the mobile.

Second generation wireless communication systems and networks are being replaced by wireless communication systems and networks that operate in accordance with third generation (3G) wireless communication standards, such as the wireless communication standards for UMTS defined by the Third Generation Partnership Project (3GPP) and the wireless communication standards for CDMA defined by the Third Generation Partnership Project—2 (3GPP2). For example, the 3GPP 33.203 and the 3GPP2 S.R0086 specifications define an Internet Protocol (IP) Multimedia Subsystem (IMS) that defines standards for using a signalling protocol called the Session Initiation Protocol (SIP). The SIP may be used to support various multimedia services that are provided to a mobile unit over an air interface. Exemplary IMS services include Internet conferencing, Internet telephony, video telephony, event notification, instant messaging, and the like.

Third generation wireless communication standards require use of the mutually authenticated Authentication and Key Agreement (AKA) security protocol. For example, the 3GPP 33.203 and the 3GPP2 S.R0086 standards define an IMS security protocol that uses the AKA security protocol to establish a security association between an IP Multimedia User Entity (UE) and the first entry node of the IMS network, e.g., a Proxy Call Session Control Function (P-CSCF). The UE typically includes an IMS Subscriber Identity Module (ISIM). The network and the UE (and/or the ISIM) may then be mutually authenticated using information stored in and/or derived by a Home Subscriber Server (HSS), an Authentication, Authorization, and Accounting server (AAA), and/or a Server Call Session Control Function (S-CSCF). Once the network and the UE have been mutually authenticated, they may communicate using Internet Protocol Security (IPSec), which is a set of protocols developed by the Internet Engineering Task Force (IETF) to support secure exchange of packets at the Internet protocol layer.

Customers using second generation R-UIM cards in a CDMA 2000 network may want to access some or all of the additional services provided by the third generation technology. For example, the customer may buy a mobile unit that supports multimedia services that are provided according to the IMS protocol. However, the second generation R-UIM cards do not support the AKA security protocol and third generation networks are not able to mutually authenticate the second generation R-UIM cards. Consequently, the customer will not be able to utilize the services defined by the IMS protocol, even though the mobile unit containing the second generation R-UIM card may support IMS functionality. Customers may also be reluctant to discard their R-UIM cards and replace them with 3G-compatible cards, which may slow adoption and implementation of multimedia services allowed by the third generation technologies.

Simply providing access to the third generation IMS functionality to customers using second generation R-UIM cards may make the network and/or the second generation R-UIM cards susceptible to numerous security threats. For one example, an attacker may impersonate the identity of a user by attaching to a CDMA 2000 packet-switched network, which may then allocate an IP address to the attacker. The attacker may register with the IMS using the attacker's IMS identity and then send an SIP invite message using the attacker's source IP address but using the IMS identity of the user in the CDMA2000 network. Conventional third generation networks do not check the binding between the IP address on the bearer level and the public and/or private user identities in the SIP layer. Consequently, the impersonation attack may succeed, resulting in the attacker using IMS services that are billed to the user. For another example, the attacker may spoof a user's IP address. Conventional third generation networks do not check the binding between the IP address allocated to each UE and the source IP address subsequently used when the UE transmits packets. Consequently, the IP spoof may succeed when second-generation UEs are allowed access to third generation IMS services, resulting in the attacker receiving IMS services while the charges for IP connectivity are billed to the user in the IMS network.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a method is provided that may include accessing a first address and an identifier provided by a mobile unit, providing the identifier, receiving a second address associated with the identifier in response to providing the identifier, and authenticating the mobile unit based on the first and second addresses.

BRIEF DESCRIPTION OF THE DRAWINGS

The invention may be understood by reference to the following description taken in conjunction with the accompanying drawings, in which like reference numerals identify like elements, and in which.

Figure 1:
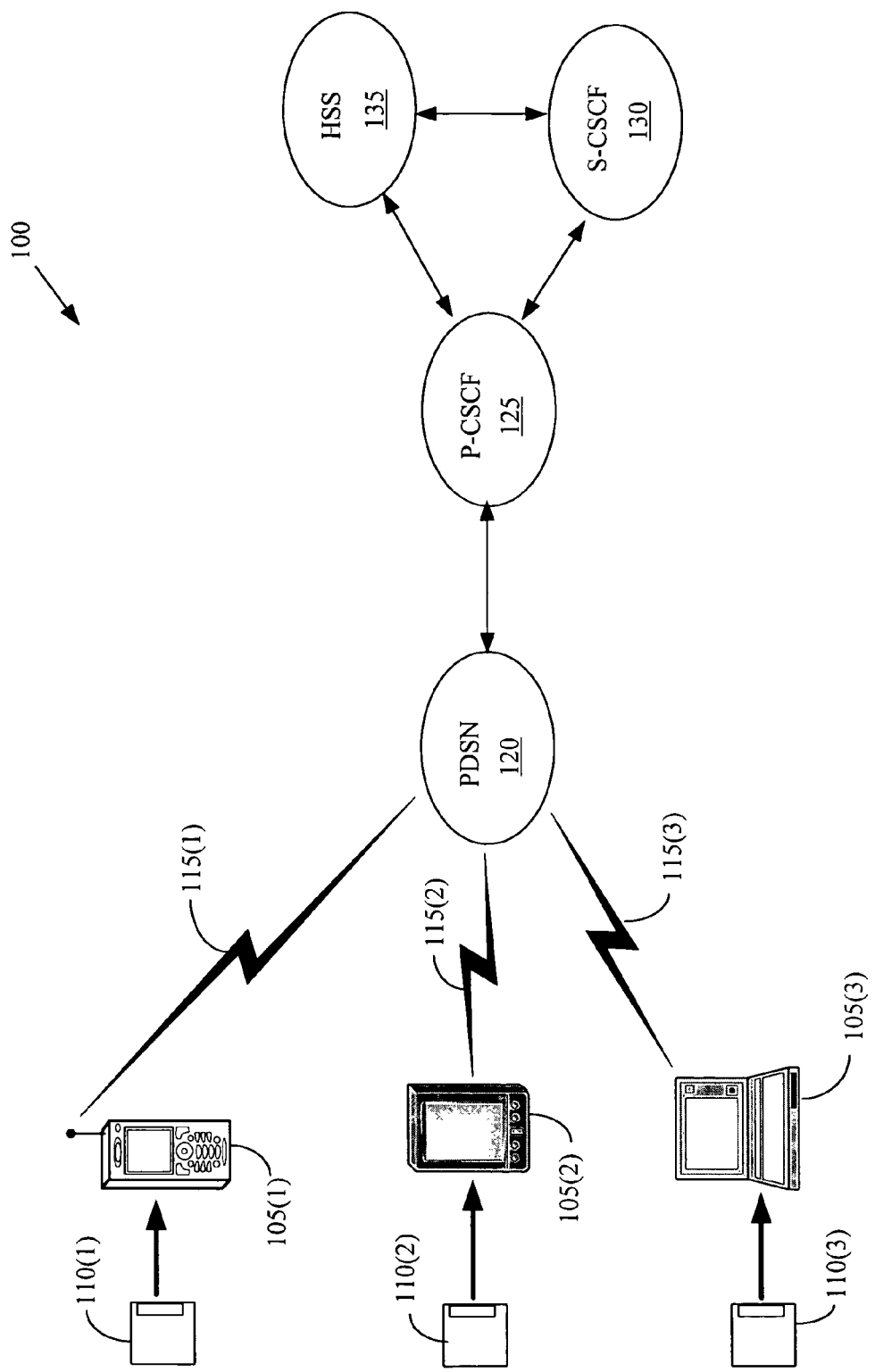
FIG. 1 conceptually illustrates one exemplary embodiment of a wireless communications system, in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

FIG. 1 conceptually illustrates one exemplary embodiment of a wireless communications system 100. In the illustrated embodiment, the wireless communications system 100 may provide wireless connectivity according to a third generation wireless communication protocol such as the Code Division Multiple Access (CDMA) protocol defined in ANSI TIA/EIA/IS-2000 standard. However, persons of ordinary skill in the art should appreciate that the present invention is not limited to a wireless communications system 100 that operates according to the CDMA protocol. In alternative embodiments, any wireless communication protocol may be used to provide wireless connectivity. Furthermore, in some embodiments, the wireless communications system 100 may include, or be connected to, one or more wired communication systems.

The wireless communications system 100 shown in FIG. 1 may provide wireless connectivity to one or more mobile units 105(1-3). In the interest of clarity, the indices (1-3) may hereinafter be dropped when the mobile units 105 are being referred to collectively. However, the indices (1-3) may be used when referring to the mobile units 105 individually or to a subset of the mobile units 105. The same convention will be used with regard to other indices that distinguish between components that share an identifying numeral. The mobile units 105 may be any type of mobile unit including, but not limited to, a cellular telephone 105(1), a personal data assistant 105(2), and a laptop computer 105(3). However, persons of ordinary skill in the art having benefit of the present disclosure should appreciate that the present invention is not limited to these particular examples of mobile units 105 and in alternative embodiments other types of mobile units 105 may also be used. Persons of ordinary skill in the art should also appreciate that the mobile units 105 may be referred to using other terms such as mobile shell, user equipment, user terminal, access terminal, and the like.

A user may provide a user identity module 110(1-3) that includes information indicative of the user, as well as information that may be used to verify the user's identity to the wireless communications system 100. In the illustrated embodiment, the user identity modules 110 are removable user identity modules (R-UIMs) 110 that operate according to second-generation wireless telecommunications standards such as the TIA/EIA-41 standard and ANSI TIA/EIA/IS-2000 standard. The user identity modules 110 may include one or more keys that are used to establish a security association with the wireless communications system 100. For example, the user identity modules 110 may each include a pre-provisioned 64-bit random number known as an A-KEY. Accordingly, the user identity modules 110 may support the 2G authentication contents specified in ANSI TIA/EIA/IS-2000 and ANSI TIA/EIA-41, may be able to process 2G authentication requests, and may be able to generate 2G session keys, such as the SMEKEY and the Private Long Code Mask (PLCM).

The mobile units 105 may establish one or more wireless communication links with the wireless communications system 100 over air interfaces 115(1-3). The air interfaces 115 may connect the mobile units 105 to a first entry node 120 of the wireless communications system 100. In the illustrated embodiment, the first entry node is a packet data switched network (PDSN) 120 that is communicatively coupled to a proxy call session control function (P-CSCF) 125. The PDSN 120 is typically responsible for the establishment, maintenance and termination of Point to Point Protocol (PPP) sessions towards the mobile units 105 and the P-CSCF 125 is typically responsible for forwarding SIP messages received from the mobile units 105. The P-CSCF 125 may be communicatively coupled to a server CSCF (S-CSCF) 130 that provides session control services and a Home Subscription Server (HSS) 135 that provides various database services. The PDSN 120, P-CSCF 125, S-CSCF 130, and HSS 135 are known in the art and in the interest of clarity only those aspects of the operation of these elements that are relevant to the present invention will be described further herein. Furthermore, persons of ordinary skill in the art having benefit of the present disclosure should appreciate that, in alternative embodiments, the first entry node 120 may be coupled more, fewer, and/or different elements of the wireless communication network 100.

The mobile units 105 may provide a subscriber identity to the first entry node 120 when the mobile units 105 register with the communication system 100. In one embodiment, the mobile units 105 provide an International Mobile Subscriber Identity (IMSI) that may be stored on the user identity module 110. When the first entry node 120 receives the subscriber identity, e.g. in a registration request message that is used to register the mobile unit 105 with the system 100, the first entry node 120 may provide an accounting request to the home subscription server 135. The accounting request may include information that may be used by the home subscription server 135 for various billing purposes. The home subscription server 135 may assign an address, such as an Internet Protocol address, to the mobile unit 105 in response to receiving the accounting request. The home subscription server 135 may also bind the subscriber identity to the allocated address so that the subscriber identity is uniquely associated with the allocated address and store the binding between the subscriber identity and the allocated address for future reference. The communication system 100 may then use the binding between the subscriber identity and the allocated address to authenticate the mobile units 105 and/or provide secure communications with the mobile units 105, as will be discussed in detail below.

Figure 2:
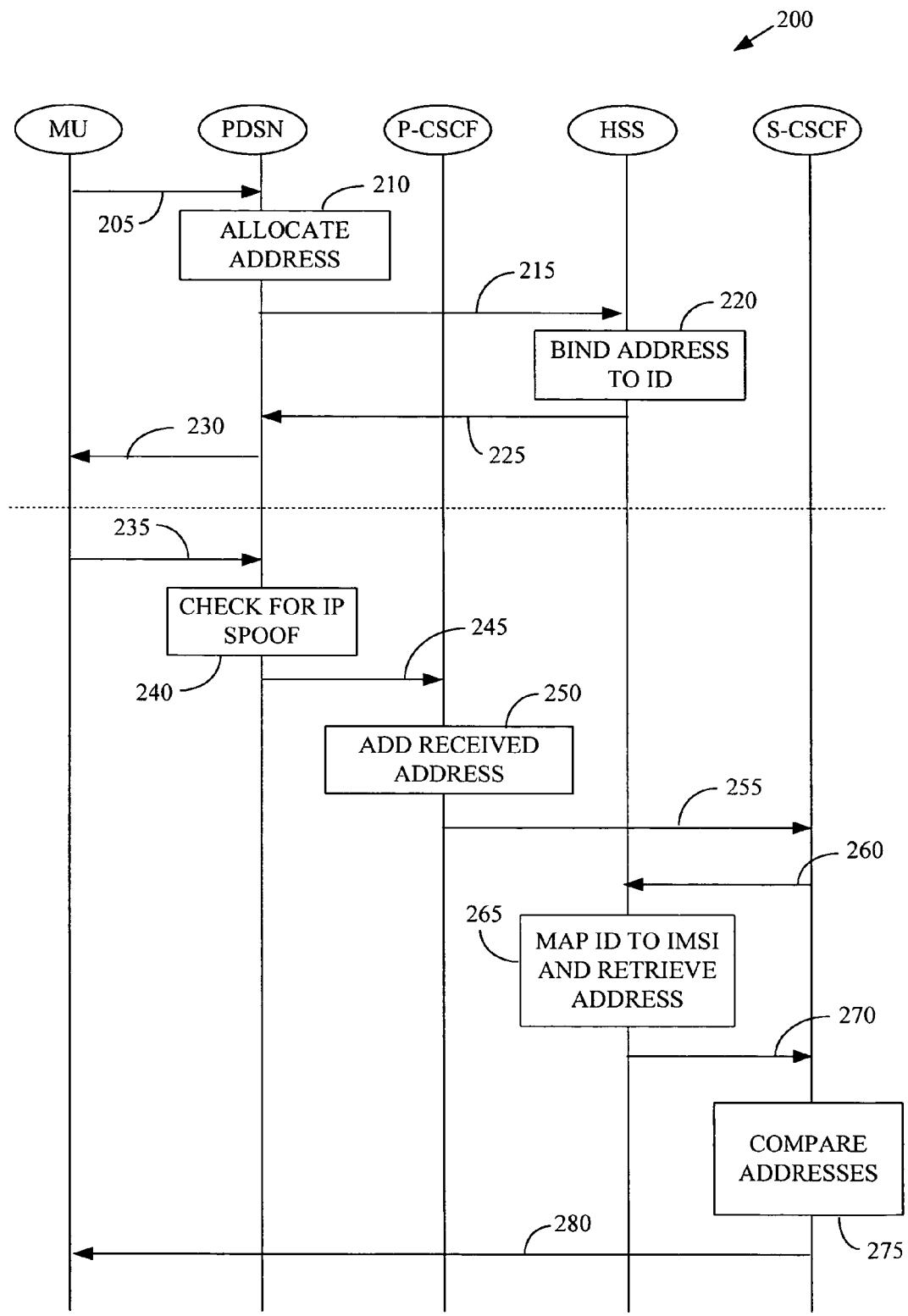
FIG. 2 conceptually illustrates one exemplary embodiment of a registration message flow that may be used to authenticate a mobile unit, in accordance with the present invention.

FIG. 2 conceptually illustrates one exemplary embodiment of a registration message flow 200 that may be used to authenticate a mobile unit (MU). In the illustrated embodiment, the mobile unit (MU) is a third-generation device which supports SIP protocol but does not support third generation AKA authentication and/or IPSec. For example, the mobile unit (MU) may include a mobile shell for an IMS network and a second-generation Removable User Identity Module (2G R-UIM). The mobile unit (MU) may be used to access third generation (3G) subsystems such as the Internet Protocol (IP) Multimedia Subsystem (IMS) using the Session Initiation Protocol (SIP). The SIP may be used to support various multimedia services that are provided to the mobile unit (MU) over an air interface. Exemplary IMS services include Internet conferencing, Internet telephony, video telephony, event notification, instant messaging, and the like. However, persons of ordinary skill in the art having benefit of the present disclosure should appreciate that the registration message flow 200 is intended to be exemplary and not to limit the present invention. In alternative embodiments, the techniques illustrated in FIG. 2 may be applied to communications between other types of mobile units and other wireless communication systems.

To establish a call session, the mobile unit may provide a registration request to a packet data switched network (PDSN), as indicated by the arrow 205. For example, the mobile unit may provide a radio traffic channel setup message that indicates that the mobile unit would like to establish a radio traffic channel. The packet data switched network may allocate (at 210) an address to the mobile unit in response to receiving the registration request. For example, the packet data switched network may allocate (at 210) an Internet Protocol address to the mobile unit. The packet data switched network may then provide a request to allocate a session to the home subscription server (HSS), as indicated by the arrow 215. In one embodiment, the packet data switched network provides (at 215) an accounting request that includes information indicative of the allocated address and a subscriber identity associated with the mobile unit. For example, the subscriber identifier may include an IMSI and/or a Mobile Station International Integrated Service Digital Network (ISDN) Number (MSISDN). In one embodiment, the accounting request may be provided (at 215) via the P-CSCF, The home subscription server may bind (at 220) the allocated address to the subscriber identifier and store information indicative of the binding of the allocated address and the subscriber identifier. For example, bindings of addresses allocated to various mobile units and the subscriber identifiers associated with these mobile units may be stored in a database resident on (or accessible to) the home subscription server. The home subscription server may also provide a message indicating completion of the registration procedure to the packet data switched network, as indicated by the arrow 225, and the packet data switched network may provide an acknowledgment to the mobile unit, as indicated by the arrow 230. The portion of the flow 200 described above may be thought of as a registration procedure, the portion described below may be considered an authentication procedure.

When the mobile unit wants to use one or more IMS applications, the mobile unit may provide a SIP registration message to the packet data switched network, as indicated by the arrow 235. In one embodiment, the SIP registration message is a request to register the mobile unit with one or more IMS applications that includes a header that contains information indicative of an address and a user identifier associated with the mobile units. For example, the SIP registration message header includes a "sent-by" field that contains an IP address associated with the mobile unit and the public user identifier of the mobile unit. The registration message provided by the mobile unit may not include an Authorization header field used by conventional 3G IMS security schemes, which may indicate that the mobile unit does not support one or more of these security schemes.

The packet data switched network may check (at 240) the registration message to determine whether or not the mobile unit is attempting to spoof one or more addresses associated with other mobile units. In one embodiment, the packet data switched network may check (at 240) the source IP address associated with packets transmitted by the mobile unit and may not allow the mobile unit to transmit the packets if the source IP address is different than the IP address assigned by the packet data switched network during establishment of the call session. If the packet data switched network determines (at 240) that the mobile unit is not attempting to spoof an IP address, the packet data switched network may provide the registration message (or information included therein) to an associated P-CSCF, as indicated by the arrow 245.

When the P-CSCF receives the registration message provided by the mobile unit, the P-CSCF may examine the address associated with the mobile unit. For example, the P-CSCF may check the IP address included in the "sent-by" parameter of a header field of the registration message provided by the mobile unit. If the "sent-by" parameter contains a domain name or an IP address that differs from the packet source IP address included in the IP packet header, the P-CSCF may add (at 250) a new parameter to the header field of the registration message. For example, the P-CSCF may add (at 250) a "received" parameter that contains the source IP address indicating the source of the received packet. The P-CSCF then provides a registration request, which may include the added parameter, to an S-CSCF, as indicated by the arrow 255.

The S-CSCF may access a user identifier in the registration message. In one embodiment, the S-CSCF accesses a public user identity in the "To" header of the registration request when the registration request does not include an Authorization header, which may indicate that the mobile unit does not support some third-generation security features. The S-CSCF may then provide a request for the address associated with the mobile unit to the home subscription server, as indicated by the arrow 260. In one embodiment, the request (at 260) for the address may include the user identifier included in the registration message. The home subscription server may then retrieve (at 265) the address associated with the mobile unit. For example, the home subscription server may map (at 265) a public user identifier associated with the mobile unit to the IMSI associated with the mobile unit and then use the IMSI binding to retrieve (at 265) the address allocated to the mobile unit during establishment of the call session. The home subscription server may provide the retrieved address to the S-CSCF, as indicated by the arrow 270.

The S-CSCF may compare (at 275) the address provided by the home subscription server to the address provided in the registration message. For example, the S-CSCF may compare (at 275) the address in the "received" parameter in a header field of the registration message provided by the mobile unit to the address stored in the home subscription server. If the two addresses match, then the S-CSCF may authenticate the mobile unit and provide a message indicating successful authentication to the mobile unit, as indicated by the arrow 280. For example, the S-CSCF may provide (at 280) a "200 ok" message indicating that the authentication was successful.

Figure 3:
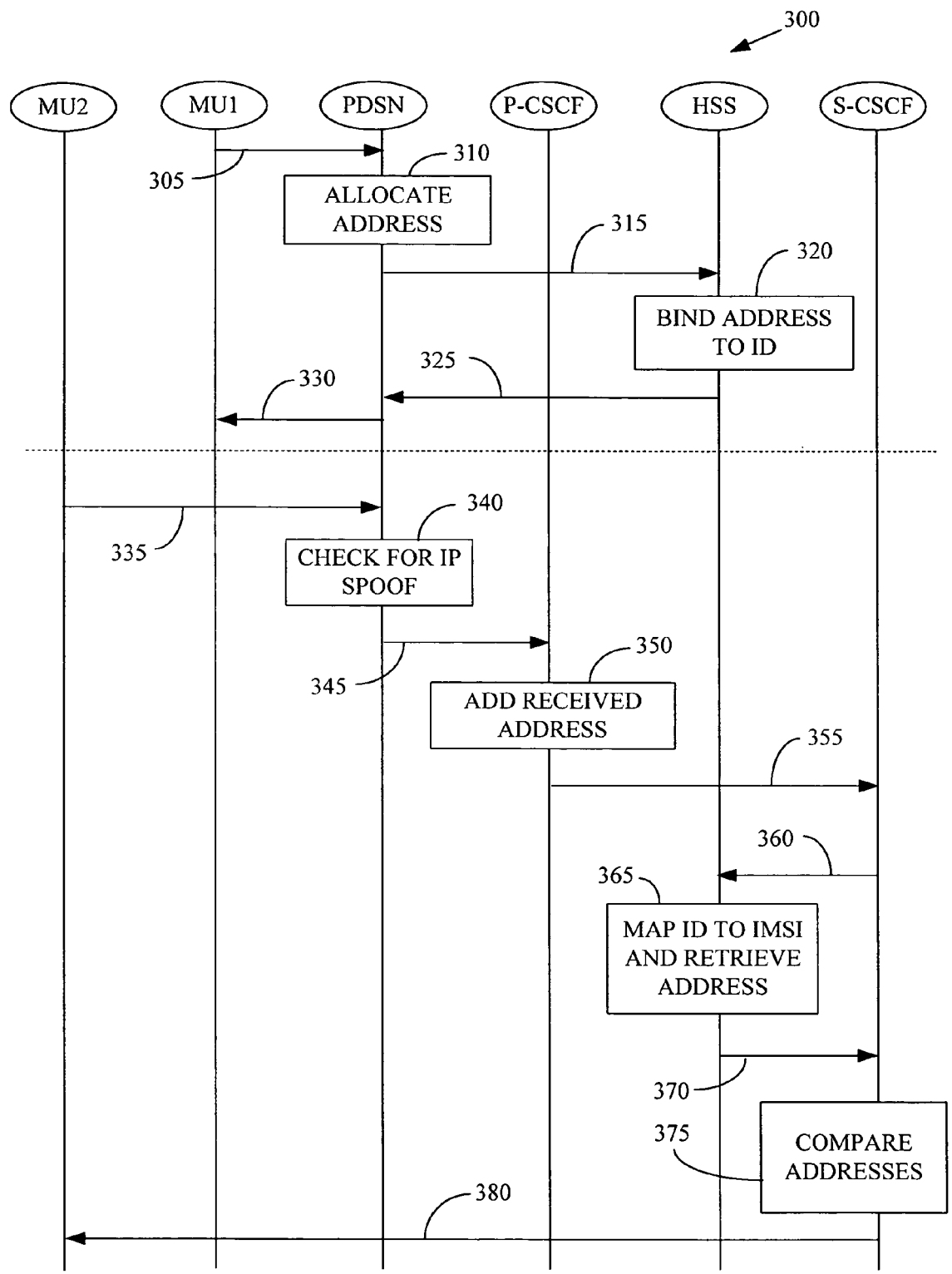
FIG. 3 conceptually illustrates one exemplary embodiment of a registration message flow that may be used to deny authentication of a mobile unit, in accordance with the present invention.

FIG. 3 conceptually illustrates one exemplary embodiment of a registration message flow that may be used to authenticate one or more mobile units (MU1, MU2). In the illustrated embodiment, the mobile units (MU1, MU2) are 3G devices that supports SIP protocol yet do not support third generation AKA authentication and/or IPSec but may be used to access third generation (3G) subsystems such as the Internet Protocol (IP) Multimedia Subsystem (IMS) using the Session Initiation Protocol (SIP), as discussed above. To establish a call session, the first mobile unit (MU1) may provide a registration request to a packet data switched network (PDSN), as indicated by the arrow 305. The packet data switched network may allocate (at 310) an address to the first mobile unit in response to receiving the registration request and then provide a request to allocate a session to the home subscription server (HSS), as indicated by the arrow 315.

The home subscription server may bind (at 320) the first mobile unit's allocated address to the subscriber identifier associated with the first mobile unit and store information indicative of the binding of the allocated address and the subscriber identifier. For example, bindings of addresses allocated to various mobile units and the subscriber identifiers associated with these mobile units may be stored in a database resident on (or accessible to) the home subscription server. The home subscription server may also provide a message indicating completion of the registration procedure for the first mobile unit to the packet data switched network, as indicated by the arrow 325, and the packet data switched network may provide an acknowledgment to the first mobile unit, as indicated by the arrow 330.

In the illustrated embodiment, a second mobile unit (MU2), e.g., an attacker, may attempt to fraudulently use information associated with the first mobile unit by providing information associated with the first mobile unit in a registration message, as indicated by the arrow 335. For example, the second mobile unit may attempt to impersonate the first mobile unit by accessing one or more IMS services by providing messages that include an address allocated to the second mobile unit and an identifier associated with the first mobile unit. For another example, the second mobile unit may attempt to spoof the first mobile unit by accessing one or more IMS services by providing messages that include an address allocated to the first mobile unit and an identifier associated with the second mobile unit.

The packet data switched network may check (at 340) the registration message to determine whether or not the second mobile unit is attempting to spoof one or more addresses associated with the first mobile unit. In one embodiment, the packet data switched network may check (at 340) the source IP address associated with packets transmitted by the second mobile unit and may not allow the second mobile unit to transmit the packets if the source IP address is different than the IP address assigned by the packet data switched network during establishment of the call session, e.g., the IP address assigned to the first mobile unit. If the packet data switched network determines (at 340) that the second mobile unit is not attempting to spoof an IP address, the packet data switched network may provide the registration message (or information included therein) to an associated P-CSCF, as indicated by the arrow 345.

When the P-CSCF receives the registration message provided by the second mobile unit, the P-CSCF may examine the address associated with the second mobile unit. For example, the P-CSCF may check the IP address included in the "sent-by" parameter of a header field provided by the second mobile unit. If the "sent-by" parameter contains a domain name or an IP address that differs from the packet source IP address, the P-CSCF may add (at 350) a new parameter to the header field. For example, the P-CSCF may add (at 350) a "received" parameter that contains the source IP address indicating the source of the received packet. The P-CSCF then provides a registration request, which may include the added parameter, to an S-CSCF, as indicated by the arrow 355.

The S-CSCF may access a user identifier in the registration message. In one embodiment, the S-CSCF accesses a public user identity in the "To" header of the registration request when the registration request does not include an Authorization header, which may indicate that the second mobile unit does not support some third-generation security features. The S-CSCF may then provide a request for the address associated with the second mobile unit to the home subscription server, as indicated by the arrow 360. In one embodiment, the request (at 360) for the address may include the user identifier included in the registration message. The home subscription server may then retrieve (at 365) the address associated with the second mobile unit. For example, the home subscription server may map (at 365) a public user identifier associated with the second mobile unit to the IMSI associated with the second mobile unit and then use the IMSI binding to retrieve (at 365) the address allocated to the second mobile unit during establishment of the call session. The home subscription server may provide the retrieved address to the S-CSCF, as indicated by the arrow 370.

The S-CSCF may compare (at 375) the address provided by the home subscription server to the address provided in the registration message. For example, the S-CSCF may compare (at 375) the address in the "received" parameter in a header field of the registration message provided by the second mobile unit to the address stored in the home subscription server. If the two addresses match, then the S-CSCF may authenticate the mobile unit and provide a message indicating successful authentication to the mobile unit, as indicated by the arrow 280. However, if the two addresses do not match, then the S-CSCF may not authenticate the second mobile unit. For example, if the second mobile unit is attempting to impersonate the first mobile unit by providing user identity associated with the first mobile unit, the two addresses may not match and the S-CSCF may not authenticate the second mobile unit. For another example, if the second mobile unit is attempting to spoof the first mobile unit by providing an IP address associated with the first mobile unit, the two addresses may not match and the S-CSCF may not authenticate the second mobile unit. The S-CSCF may then provide a message indicating a failed authentication to the second mobile unit, as indicated by the arrow 380. For example, the S-CSCF may provide (at 380) a "403 Forbidden" message indicating that the authentication was not successful. Thus, by implementing embodiments of the authentication techniques described above, the attempt by the attacker (MU2) to spoof the IMS identity of a legal IMS user (MU1), or an attempt by MU1 to spoof the IMS identity of MU1, may be foiled.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method of communication involving a network that comprises a packet data switched network, a home subscriber server, and serving and proxy call session control functions, the method comprising:
   accessing, at the serving call session control function, a first Internet Protocol (IP) address and a public user identifier provided by a third generation mobile unit including a second-generation removable user-identity module to the proxy call session control function;
   providing the public user identifier to the home subscriber server;
   receiving, at the serving call session control function from the home subscriber server, a second IP address associated with the public user identifier in response to providing the public user identifier; and
   authenticating communication between the third generation mobile unit and the packet data switched network based on the first and second IP addresses.

2. The method of claim 1, wherein accessing the first address and the public user identifier comprises accessing the first IP address and the public user identifier included in a header of a Session Initiation Protocol registration message provided by the third generation mobile unit.

3. The method of claim 1, wherein receiving the second IP address from the home subscriber server comprises receiving, from the home subscriber server, a second IP address determined based on a binding between the public user identifier and the second IP address, the second IP address being bound to the public user identifier in response to the packet data switched network allocating the second IP address to the third generation mobile unit.

4. The method of claim 1, wherein authenticating communication between the third generation-mobile unit and the packet data switched network comprises comparing the first and second IP addresses at the serving call session control function.

5. The method of claim 4, wherein authenticating communication between the third generation mobile unit and the packet data switched network comprises providing an indication that authentication of the third generation mobile unit is successful if the first and second IP addresses are the same.

6. The method of claim 4, wherein authenticating the third generation mobile unit comprises providing an indication that authentication of the third generation mobile unit has failed if the first and second IP addresses are not the same.

7. A method of communication involving a network that comprises a packet data switched network, a home subscriber server, and serving and proxy call session control functions, the method comprising:
   receiving, at the home subscriber server and from the serving call session control function, a public user identifier provided to the packet data switched network by a third generation-mobile unit, the third generation-mobile unit having also provided a first Internet Protocol (IP) address and wherein the third generation mobile unit includes a second-generation removable user-identity module; and
   determining, at the home subscriber server, a second IP address based on the public user identifier and a binding between the public user identifier and the second IP address.

8. The method of claim 7, wherein receiving the public user identifier comprises receiving the public user identifier included in a header of a Session Initiation Protocol registration message provided by the third generation mobile unit.

9. The method of claim 7, wherein determining the second IP address based on the public user identifier comprises determining a subscriber identity based on the public user identifier.

10. The method of claim 9, wherein determining the second IP address comprises determining the second IP address using the subscriber identity.

11. The method of claim 7, comprising providing the second IP address to the serving call session control function.

12. The method of claim 11, wherein providing the second IP address comprises providing the second address to the serving call session control function, the serving call session control function being configured to authenticate communication with the third generation mobile unit based on the first and second IP addresses.

13. The method of claim 7, comprising receiving, at the home subscriber server, an accounting request including information indicative of a subscriber identity, the accounting request being provided by the packet data switched network.

14. The method of claim 13, comprising allocating, at the packet data switched network, the second IP address and binding the IP second address to the subscriber identity.

15. A method of communication involving a network that comprises a packet data switched network, a home subscriber server, and serving and proxy call session control functions, the method comprising:
   receiving, at the proxy call session control function, a first Internet Protocol (IP) address and a public user identifier provided in a message by a third generation mobile unit including a second-generation removable user-identity module;
   determining, at the proxy call session control function, a second IP address indicative of the source from which the message was received; and
   providing, from the proxy call session control function to the serving call session control function, the public user identifier and the first and second IP addresses.

16. The method of claim 15, wherein receiving the public user identifier and the first IP address comprises receiving the public user identifier and the first IP address in a header field of a packet provided to the packet data switched network by the third generation mobile unit.

17. The method of claim 15, wherein determining the second IP address comprises determining a packet source IP address.

18. The method of claim 15, wherein providing the public user identifier and the first and second IP addresses comprises providing the public user identifier and the first and second IP address to the serving call session control function so that the serving call session control function can authenticate the third generation mobile unit using an address binding stored in the home subscription server.

* * * * *